H. DOTZER AND S. G. BARNARD.
PISTON.
APPLICATION FILED DEC. 17, 1919.
1,382,895.
Patented June 28, 1921.
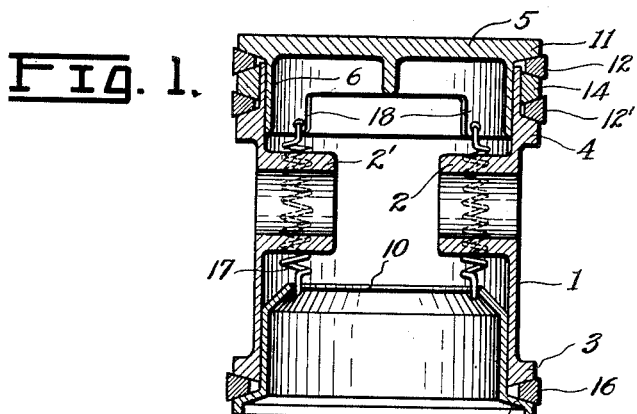
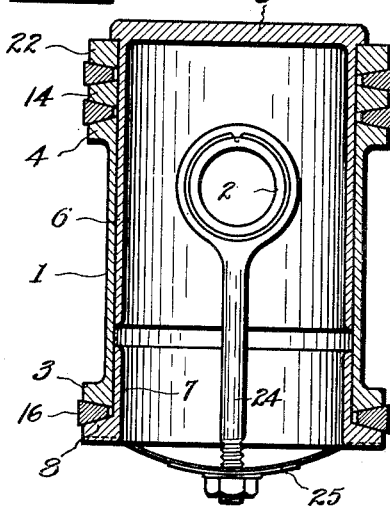
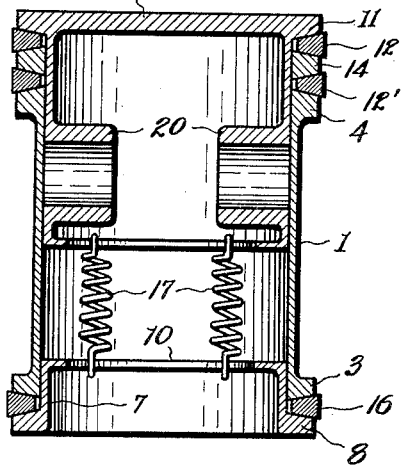
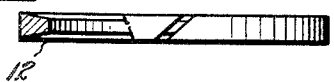
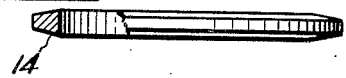
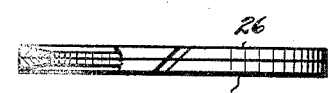
Inventor
Hugo Dotzer
Samuel G. Barnard
By Attorney
Richard J. Cook.

UNITED STATES PATENT OFFICE.

HUGO DOTZER AND SAMUEL G. BARNARD, OF SEATTLE, WASHINGTON.

PISTON.

1,382,895.  Specification of Letters Patent.  Patented June 28, 1921.

Application filed December 17, 1919. Serial No. 345,613.

*To all whom it may concern:*

Be it known that we, HUGO DOTZER and SAMUEL G. BARNARD, a citizen of Germany and a citizen of the United States, and residents of the city of Seattle, county of King, and State of Washington, have invented certain new and useful Improvements in Pistons, of which the following is a specification.

Our invention relates to improvements in pistons, and more particularly to pistons of that character principally used in internal combustion engines, commonly designated as trunk pistons and wherein the piston is equipped with one or more expandible rings which serve to prevent leakage between the piston and walls of the cylinder wherein it operates.

In assembling piston rings with the ordinary type of piston which is provided with circumferential grooves for receiving the same, the rings, which are broken at one point to permit expansion, are placed in the grooves after being sprung apart and slipped over the end of the piston. This is not only inconvenient and difficult, but also necessitates a certain construction in the rings which acts as a detriment to the cylinder in which it is used; this being due to the fact that such rings are necessarily made heavier and stronger at the center point between the yieldable ends, and are tapered from this center point so that they may be sprung apart, yet when released will retain their necessary resiliency.

It is apparent that rings of this character must possess a certain stiffness and consequently will not easily yield sufficiently to be placed in position, and as a result many are broken while being assembled with the piston.

It is also known that such rings, being stiffer at their center point than at their ends, cause an uneven wearing on the cylinder walls, which is undesirable and detrimental to the efficiency of the engine.

It is, therefore, an object of the invention to provide a piston of a construction which not only facilitates assembly of the piston rings therewith but which also permits the construction and use of piston rings having an equal outward tension throughout the circumference, which will bear equally at all points, against the cylinder walls, and which will not cause uneven wearing either on the rings themselves or on the cylinder walls.

It is a further object of the invention to provide a piston wherein only the rings thereof are exposed to wear and which automatically adjust themselves to a tight fit under all conditions resultant to temperature changes, expansion or contraction of the piston body.

In accomplishing these and other objects of the invention we have provided the improved details of construction, the preferred forms of which are illustrated in the accompanying drawings, wherein, Figure 1 is a longitudinal sectional view of a piston constructed according to the present invention, wherein the pressure of compressing or the exploding of a fuel charge acts against the surface area of the end of the piston to expand the piston rings.

Fig. 2 is a horizontal, sectional view of a similar type of piston, particularly adapted to high pressure engines and wherein the pressure to expand the rings is exerted through a narrow peripheral band.

Fig. 3 is a vertical section of a piston of an alternative type of construction.

Fig. 4 is a side view, partly in section, of a preferred type of piston ring used with pistons of this character.

Fig. 5 is a side view, partly in section, of a spacing ring used between the packing rings.

Fig. 6 shows a side view, partly in section, of a combination of rings applicable to pistons of this character.

Fig. 7 is a side view, partly in section, of a pressure ring used in pistons as shown in Fig. 2.

Referring more in detail to the drawings, 1 designates the cylindrical body portion of a piston, provided interiorly with diametrically disposed bearings, 2, 2', for receiving the ends of a wrist pin, whereon the end of the piston rod is connected; the latter parts not being shown.

The body portion of the piston is of slightly lesser diameter than the cylinder wherein it is adapted to operate and is provided at its lower end, and, as in Fig. 1, slightly spaced from its upper end, with shoulders 3 and 4, respectively, the faces toward the ends of the cylinder are outwardly beveled or sloped; the outer diameter of the shouldered portions being substantially the same as that of the cylinder in which they are to operate.

Mounted at the upper end of the piston body is a head 5, of practically the same diameter as the shoulders 3 and 4, and having a concentrically extending extension sleeve 6 slidably contained within the upper end of the cylindrical body 1. Likewise a sleeve 7 is slidably fitted within the lower end of the piston, which, as in Fig. 1, is provided at its lower end with an outwardly and downwardly inclined shoulder 8 having a downwardly extending peripheral flange 9 which alines with the circumference of the shoulders 3 and 4. This latter sleeve also is provided at its upper, or inner end, with an inwardly inclined rim 10.

The rim, or shoulder, 11, between the sleeve 6 and circumferential edge of the head 5, on its inner face, is sloped or beveled oppositely to the beveled face of the shoulder 4, and interposed between these two shoulders, 4 and 11, and inclosing the upper end of the piston body, are two split piston rings, 12 and 12', the opposite faces of which are beveled in accordance with the shoulders whereon they seat.

Interposed between these two rings is a spacing band, 14, having its opposite faces beveled to fit the two rings, 12 and 12'; the bevel of the rings, shoulders and spacing ring being such that pressure exerted against the head 5 will tend to expand the rings 12 and 12', so that they will tightly engage the cylinder walls.

A piston ring 16 is also seated between the shoulder 3 at the lower end of the piston and the shoulder 8 on the sleeve 7, which has inwardly beveled opposite faces fitting the shoulders so that similarly as the rings 12 and 12', are expanded, this ring is also expanded when pressure is exerted thereagainst.

The head 5 and sleeve 7 are retained in functional position in opposite ends of the piston body by means of two coiled springs 17, which are attached at their lower ends to the rim or flange 10 of the sleeve 7, and at their upper ends are attached to webs 18 formed as a part of, and reinforce the head 5 and its sleeve 6, the springs being utilized to permit the head and sleeve to follow up the expanding or contracting movement of the piston rings.

Figs. 2 and 3 illustrate alternative types of construction, wherein the head 5 is provided with bearings 20 for receiving the wrist pin, so that the head can be connected directly to the piston rod. In the construction shown in Fig. 2, the pressure against the piston rings, which would tend to expand them, is greatly reduced by the insertion of a band 22 between the upper ring 12 and the reduced shoulder formed about the periphery of the head. Such a piston is applicable to engines of such high pressure that the construction of Fig. 1 would be impractical. In the latter case, the pressure which expands the rings is limited to that which may be exerted against the exposed surface of the band 22.

In the construction of Fig. 3 the rings are expanded almost entirely by the pressure of the springs which hold the parts together.

Fig. 2 also illustrates an alternative manner of retaining the parts together, which consists of bolts 24 pivotally fixed at their upper end about the bearings 2 and at their lower ends fixed to leaf springs 25 which engage the lower ends of the sleeve 7.

Fig. 6 showing paired piston rings 26, 26', which may be fitted together to form a ring similar to the ring 12.

It is apparent that in pistons of this character, the piston rings may be easily assembled therewith, without danger of breaking or impairing their resiliency, and which may be so made that equal pressure is exerted at all points thereof against the cylinder walls causing even wear on both rings and cylinders.

Having thus described our invention, what we claim as new therein and desire to secure by Letters Patent is:

1. A piston comprising a cylindrical body portion whereto a piston rod may be attached, and having an outwardly beveled peripheral shoulder at an end thereof, a head having a cylindrical sleeve extending substantially within and slidably fitting the piston body wall, and having a peripheral shoulder beveled oppositely to and opposing the first named shoulder, an expandible piston ring mounted between and having its opposite faces beveled to fit said shoulders and yieldable means inclosed within the piston body and head for retaining said head within said body and against said piston ring.

2. A trunk piston comprising a cylindrical body portion whereto a piston rod may be operatively attached and having outwardly beveled peripheral shoulders at its opposite ends, relatively movable members telescopically mounted within the opposite ends of said body and having peripheral shoulders opposing and beveled oppositely to the first named shoulders, inwardly tapered, expandible piston rings mounted between said opposing shoulders and expandible under pressure thereagainst and yieldable means connecting the said movable end members together within the body.

3. A piston comprising a cylindrical body portion whereto a piston rod may be attached and provided adjacent one end with a peripheral, outwardly beveled shoulder, a head having a cylindrical sleeve extending slidably within the body and having a peripheral shoulder beveled outwardly and in opposed relation to the first named shoulder, a plurality of expandible piston rings mounted about the end of said body and having inwardly beveled faces seated against said beveled shoulders, an outwardly tapered band mounted between the piston rings, and yieldable means for retaining the head and body in functional relation against said piston rings.

4. A trunk piston comprising a cylindrical body portion having an outwardly beveled peripheral shoulder at its upper end, a head telescopically mounted within the upper end of said body and provided with a peripheral flange, a ring, having its lower surface beveled oppositely to said shoulder, mounted about said head to seat against said flange and adapted to receive pressure of compression against its upper surface, an expandible piston ring having its opposite faces beveled to fit said body shoulder and ring, mounted between the same and yieldable means for retaining the parts functionally assembled.

Signed at Seattle, Washington, this 5th day of December, 1919.

HUGO DOTZER.
SAMUEL G. BARNARD.